United States Patent [19]

Schnabel, Jr. et al.

[11] Patent Number: 5,679,124
[45] Date of Patent: Oct. 21, 1997

[54] COOLING RING ASSEMBLY FOR CONTROLLING STRESSES IN A FORMED GLASS SHEET

[75] Inventors: James P. Schnabel, Jr., Maumee; Donivan M. Shetterly, Toledo; Robert E. Malby, Jr., Wayne, all of Ohio

[73] Assignee: Glasstech, Inc., Perrysburg, Ohio

[21] Appl. No.: 510,591

[22] Filed: Aug. 2, 1995

[51] Int. Cl.$^6$ .................................. C03B 27/04
[52] U.S. Cl. .................... 65/348; 65/351; 65/115; 65/273; 65/288
[58] Field of Search ............... 65/348, 351, 288, 65/287, 273, 114, 115, 104

[56] References Cited

U.S. PATENT DOCUMENTS

| | | | |
|---|---|---|---|
| 3,102,802 | 9/1963 | Carson et al. | 65/288 |
| 3,137,558 | 6/1964 | Oberstar | 65/288 |
| 3,253,898 | 5/1966 | Leflet, Jr. | 65/288 |
| 3,265,488 | 8/1966 | Ross et al. | 65/288 |
| 3,418,098 | 12/1968 | Kirkman | 65/288 |
| 3,741,743 | 6/1973 | Seymour | 65/287 |
| 4,400,194 | 8/1983 | Starr | 65/114 |
| 4,661,142 | 4/1987 | Bartusel et al. | 65/348 |
| 4,687,501 | 8/1987 | Reese | 65/103 |
| 4,749,399 | 6/1988 | Yamada et al. | 65/273 |
| 4,826,522 | 5/1989 | d'Iribarne et al. | 65/115 |
| 4,871,385 | 10/1989 | Lecourt et al. | |
| 4,983,200 | 1/1991 | Reese et al. | 65/104 |
| 5,021,075 | 6/1991 | Vanaschen et al. | 65/287 |
| 5,022,906 | 6/1991 | Vanaschen et al. | 65/104 |
| 5,069,703 | 12/1991 | d'Iribarne et al. | 65/104 |
| 5,093,177 | 3/1992 | Anderson et al. | 428/81 |
| 5,118,335 | 6/1992 | Claassen et al. | 65/348 |
| 5,147,721 | 9/1992 | Baron et al. | 428/365 |
| 5,244,720 | 9/1993 | Leung et al. | 428/266 |
| 5,385,786 | 1/1995 | Shetterly et al. | 428/432 |
| 5,536,581 | 7/1996 | Shetterly et al. | 65/115 |
| 5,591,245 | 1/1997 | Salonen | 65/104 |

FOREIGN PATENT DOCUMENTS

| | | |
|---|---|---|
| 2064519 | 12/1992 | Canada . |
| 0373992 | 6/1990 | European Pat. Off. . |
| 0400631 | 12/1990 | European Pat. Off. . |
| 2572388 | 5/1986 | France . |
| 2667308 | 4/1992 | France . |
| 2677638 | 12/1992 | France . |

OTHER PUBLICATIONS

Suppkementary European Search Report, three pages, Application No. EP 94 90 7421.

*Primary Examiner*—Steven P. Griffin
*Attorney, Agent, or Firm*—Brooks & Kushman P.C.

[57] ABSTRACT

A cooling ring assembly (20) and method for controlling stresses in a bent glass sheet G produce a strengthened bent glass sheet after the cooling is completed. The cooling ring assembly includes a cooling ring (22) that supports the glass sheet edge (24), an insulator (30) juxtaposed inboard of the cooling ring to reduce the cooling rate, and a cooler (34) for providing increased cooling to at least one localized area (36,40,58) of the glass sheet edge. The cooler (34) is embodied by a pressurized air supply (42).

8 Claims, 4 Drawing Sheets

COOLING RING ASSEMBLY FOR CONTROLLING STRESSES IN A FORMED GLASS SHEET

TECHNICAL FIELD

This invention relates to a cooling ring assembly and a method for cooling a hot formed glass sheet in a manner that controls stresses, and the invention also relates to the glass sheet that has been cooled on the cooling ring assembly by the method.

BACKGROUND ART

One way in which laminated glass windows for vehicles have been formed in the past involves placing pairs of glass sheets to be formed onto molds that are circulated through a hot furnace for gradual heating and gravity sagging on the molds to the formed shape desired. After such sagging, the glass sheets are slowly allowed to cool to provide annealing that removes most of the stress from the glass sheets. This slow cooling is performed along a furnace section having a decreasing temperature gradient and is referred to as "active" annealing. Edge compression for such glass sheets is normally about 150 to 200 KG/cm$^2$. Normally there is also some separation between the sheets inward from their peripheries due to thermal warpage that is subsequently overcome by laminating of the sheets to each other by the use of polyvinyl butyral in a conventional laminating process.

Laminated glass windows have also been previously manufactured by press bending which utilizes either natural convection or low level forced air cooling that advantageously produces a somewhat greater edge compression of about 300 to 400 KG/cm$^2$. This greater edge compression advantageously makes the formed glass sheet less susceptible to edge breakage. However, since the integrated sum of the compression and tension of the glass sheet must equal zero, there is a band of tension inboard from the outer edge surface that is necessarily higher for such press formed glass sheets than for glass sheets that are actively annealed so as to have lower edge stresses. More specifically, whereas formed glass sheets that have been actively annealed normally have a net inner band tension (NIBT) of about 25 to 50 KG/cm$^2$, press formed glass sheets typically have a net inner band tension of about 50 to 100 KG/cm$^2$.

Formed glass sheets having a net inner band tension in excess of about 60 KG/cm$^2$ can result in undesirable breakage which is usually tested for by the "scratch test" for windshields. In the scratch test, either the individually formed glass sheet or the laminated pair of glass sheets are abraded using 80 grit aluminum sandpaper in a band about six inches wide immediately inside the glass edge. If cracking occurs within twenty-four hours of such abrasion, the sample is considered to have failed the scratch test. This usually occurs with formed glass sheets having a net inner band tension in excess of about 60 KG/cm$^2$ while those with a lesser net inner band tension usually pass this test. This scratch test is considered a good measure of the propensity of an installed laminated vehicle window to crack from incidental abrasion or from stone impact.

It is generally understood that edge compression of less than about 150 to 200 KG/cm$^2$ can result in breakage of a laminated glass window during installation into a vehicle window opening, such as a front laminated windshield. Higher edge compression like the 300 to 400 KG/cm$^2$ normally present with pressed formed glass sheets reduces the tendency of breakage during installation.

U.S. Pat. No. 4,687,501 Reese discloses lightweight bending iron heat shields for glass bending molds operable to shade glass sheets from a heat source. The heat shields are utilized to change the heating rate of the different areas of the glass sheets to affect the final shape.

U.S. Pat. No. 5,069,703 d'Iribarne et al discloses a covering for tempering of glass sheets wherein a metallic fabric is used to cover a frame that supports a glass sheet being annealed. This metallic fabric is of low thermal conductivity and reduces the heat sink characteristics of the support frame.

U.S. Pat. No. 5,285,786 Shetterly et al discloses a glass sheet annealing ring and method for reducing the maximum value of the net inner band tension while maintaining edge compression as the glass sheet is cooled. This is performed by an insulating ring juxtaposed inboard of the annealing ring to reduce the cooling rate of the glass sheet in proximity to the area where the net inner band tension is located. However, with such an insulating ring, the cooling rate is not reduced to as great an extent at localized areas where a metallic coating is provided such as at bus bars of a vehicle window heater or wiper heaters for a vehicle window.

Another problem with formed glass sheets is that current designs have relatively abrupt curvatures where breakage can take place prior to installation due to the magnitude of forces generated particularly adjacent the glass sheet edge at such abrupt curvatures. This often takes place when a pair of formed glass sheets that are laminated to each other do not have complementary mating shapes, such that stress is placed in the glass by forcing each formed glass sheet to the shape of the other.

DISCLOSURE OF INVENTION

One object of the present invention is to provide an improved cooling ring assembly on which a hot glass sheet that has been formed is cooled in a manner that enhances the mechanical properties of the finally cooled glass sheet.

In carrying out the above object, the cooling ring assembly includes a cooling ring that supports the edge of the formed glass sheet for the cooling. An insulator of the cooling ring assembly is juxtaposed inboard of the cooling ring to reduce the cooling rate of the inner edge portion of the glass sheet and thereby reduce the maximum value of the net inner band tension at the inner edge portion after the cooling is completed. A cooler of the cooling ring assembly provides increased cooling to a localized area of the edge of the formed glass sheet as compared to the rest of the edge to increase the surface compression and depth thereof at the localized area after the cooling is completed.

The cooling ring assembly has the cooler constructed as a pressurized air supply that supplies a flow of pressurized air to the localized area of the formed glass sheet edge for the increased cooling without flow of the pressurized air to a central portion of the glass sheet. This pressurized air supply as disclosed includes a tube having outlets through which the pressurized air flows to the localized area of the formed glass sheet edge for the increased cooling. As disclosed, the tube has a rectangular cross section which facilitates shaping thereof to the required shape while maintaining the proper direction of flow of the pressurized air through its outlets.

As disclosed, the cooling ring assembly has the cooler constructed to cool a plurality of spaced localized areas of the edge of the formed glass sheet. In one construction, the spaced localized areas at which the cooling takes place is designed to cool coated locations such as metallic coatings of the type utilized for bus bars of a vehicle window heater or one or more wiper heaters for a vehicle window. In another construction, the localized areas are cooled to provide increased glass strength at the edge.

In its preferred construction, the cooling ring assembly includes a support ring, an adjustable mount that adjustably mounts the cooling ring on the support ring, and an insulator and cooler support that mounts the insulator and the cooler on the support ring. The cooling ring also preferably includes a metallic mesh that engages the edge of the formed glass sheet to provide its support during the cooling while reducing conductive heat transfer between the cooling ring and the supported glass surface.

Another object of the present invention is to provide a method for cooling a hot glass sheet that has been formed in a manner that enhances the mechanical properties of the glass sheet after the cooling is completed.

In carrying out the above object, the method for cooling the hot glass sheet is performed by insulating the edge of the formed glass sheet to retard cooling thereof and reduce the maximum value of the net inner band tension at the inner edge portion after the cooling is completed. This cooling of the formed glass sheet is performed while providing increased cooling to a localized area of the edge as compared to the rest of the edge to increase the surface compression and depth thereof at the localized area after the cooling is completed.

In the preferred practice, the method is performed by providing the increased cooling of the localized area by pressurized air. The glass sheet cooling method is performed in different ways as disclosed. In one practice of the method, the increased cooling is performed at a localized area having a coating that affects cooling, such as a metallic coating. The increased cooling is disclosed as being performed at a plurality of localized areas that are spaced from each other. In one practice, the method is performed at spaced localized areas that each have a coating such as a metallic coating utilized for bus bars of a vehicle window heater or one or more heaters for a vehicle window wiper. In another practice, the increased cooling is performed at spaced localized areas of the edge of the formed glass sheet to provide increased resistance to breakage upon bending about an axis extending between the spaced localized areas.

Another object of the present invention is to provide a glass sheet that has been formed while hot and subsequently cooled in a manner that enhances its mechanical properties.

In carrying out the above object, the glass sheet has an edge having a net inner band tension with a maximum value of less than 60 KG/cm$^2$. The edge of the glass sheet also has a localized area with increased surface compression provided by increased cooling thereof as compared to the rest of the edge so the surface compression of the localized is greater and deeper than it would be without such increased cooling of the localized area.

In one embodiment, the formed glass sheet has the localized area provided with a metallic coating where the increased cooling takes place to provide the increased surface compression. The formed glass sheet is disclosed as having a plurality of the localized areas where the increased surface compression is provided in a spaced relationship from each other.

Another embodiment of the formed glass sheet has a pair of the localized areas with increased surface compression to reduce breakage upon bending of the formed glass sheet about an axis extending between the pair of localized areas which provides a particular advantage adjacent abruptly curved areas of the formed glass sheet by reducing bending.

The objects, features and advantages of the present invention are readily apparent from the following detailed description of the best modes for carrying out the invention when taken in connection with the accompanying drawings.

BEST MODES FOR CARRYING OUT THE INVENTION

Figure 1:
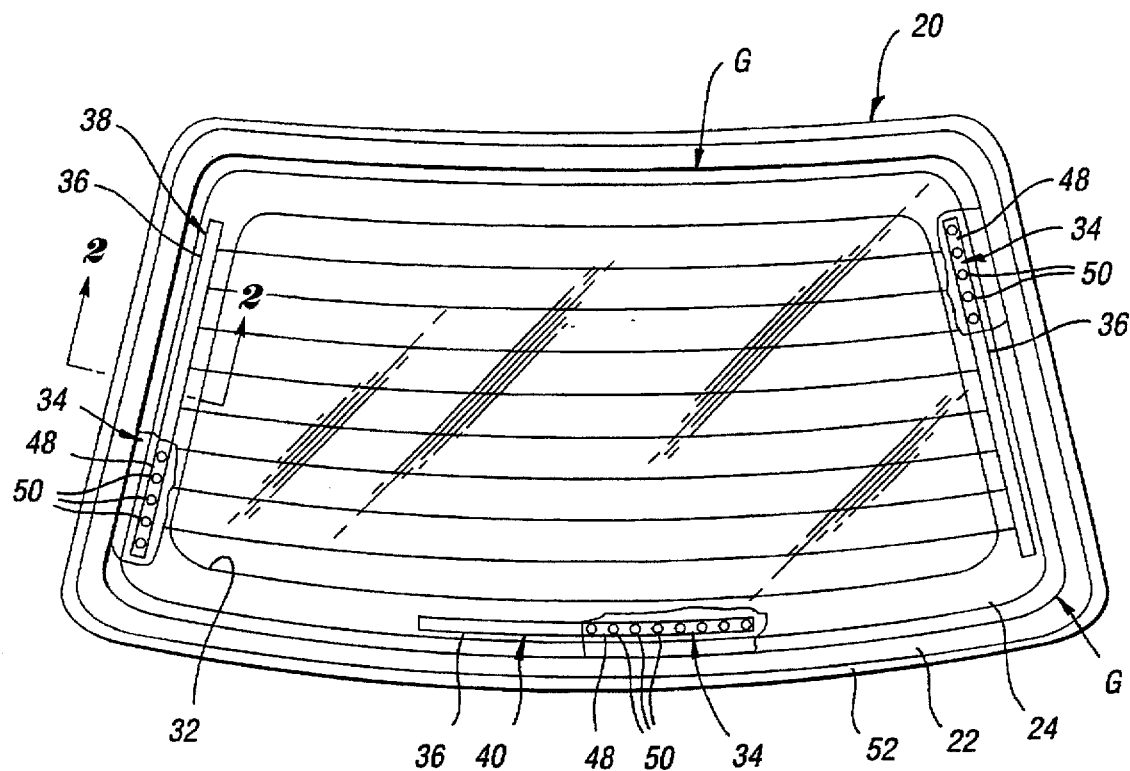
FIG. 1 is a partially broken away plan view of a glass sheet cooling ring assembly constructed in accordance with the present invention to cool a formed hot glass sheet shown supported on the cooling ring assembly.
Figure 2:
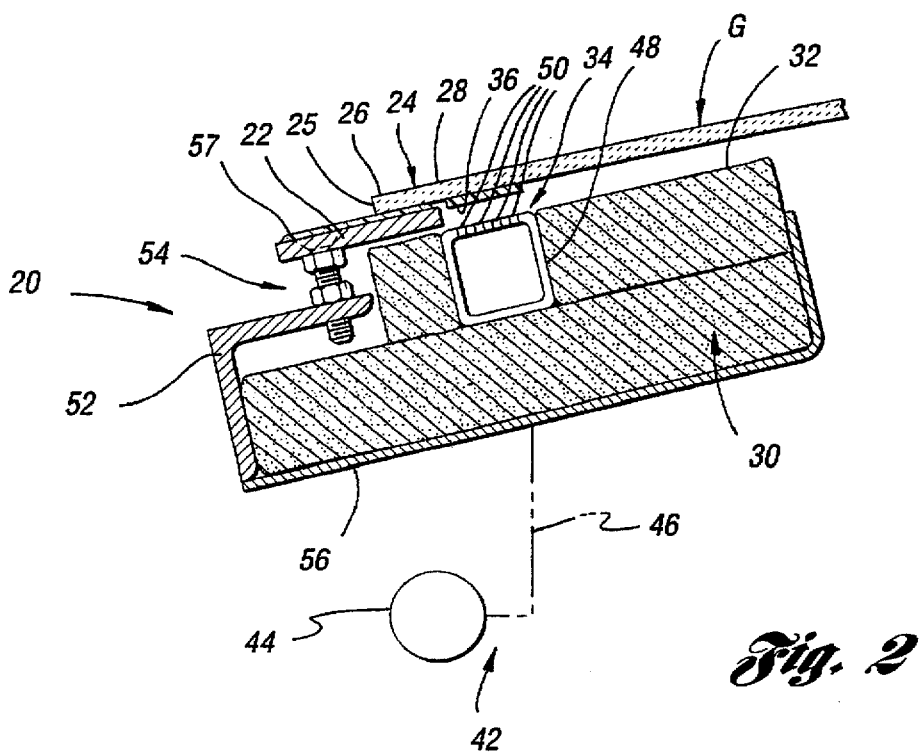
FIG. 2 is an elevational view taken in section along the direction of line 2—2 in FIG. 1 through the glass sheet cooling ring assembly and the glass sheet supported thereon.

With reference to FIGS. 1 and 2 of the drawings, a cooling ring assembly generally designated by 20 is constructed in accordance with the present invention to perform the method thereof for cooling a formed hot glass sheet G which is the resultant product that also embodies the invention. The cooling ring assembly 20, the method for cooling the formed hot glass sheet G and the resultant cooled glass sheet G will all be described in an integrated manner to facilitate an understanding of the different aspects of the invention.

The cooling ring assembly 20 supports the glass sheet G after it has been formed but while still hot and permits the glass sheet to be cooled in a manner which controls the resultant stress to enhances its mechanical strength as is hereinafter more fully described. This cooling ring assembly 20 includes a cooling ring 22 that supports the edge 24 of the glass sheet G. This glass sheet edge 24 is located just inboard from the extreme outer edge surface 25 and includes an outer portion 26 and an inner portion 28. As is hereinafter more fully described, the outer edge portion 26 of the glass sheet edge 24 is completely in compression while the inner edge portion 28 has a net tension that counterbalances the compression and forms a band around the periphery of the glass sheet which is referred to as net inner band tension. Inboard from the inner edge portion 28, the glass sheet has stresses that are substantially unaffected by edge cooling.

With continuing reference to FIG. 2, the cooling ring assembly includes an insulator generally designated as 30 juxtaposed inboard of the cooling ring 22 to reduce the cooling rate of the inner edge portion 28 of the glass sheet and thereby reduce the maximum value of the net inner band tension of the inner edge portion after the cooling is completed. This insulator 30 has a surface 32 that opposes the downwardly facing surface of the glass sheet G inboard from the cooling ring 22 and is made as a glass fiber matrix material having very low thermal conductivity so as to retard the cooling at the inner edge portion of the glass sheet and thereby reduce the net inner band tension of the inner edge portion 28 after the cooling is completed. The specific insulator material utilized is sold by Thermal Ceramics, Inc. of Augusta, Ga., United States of America under the Trademark KAOWOOL. It is also possible to cover the insulator 30 with a stainless steel screen to prevent a vacuum applied to an associated bending mold, when cycled without a glass sheet, from sucking the glass fibers from the matrix material.

Figure 3:
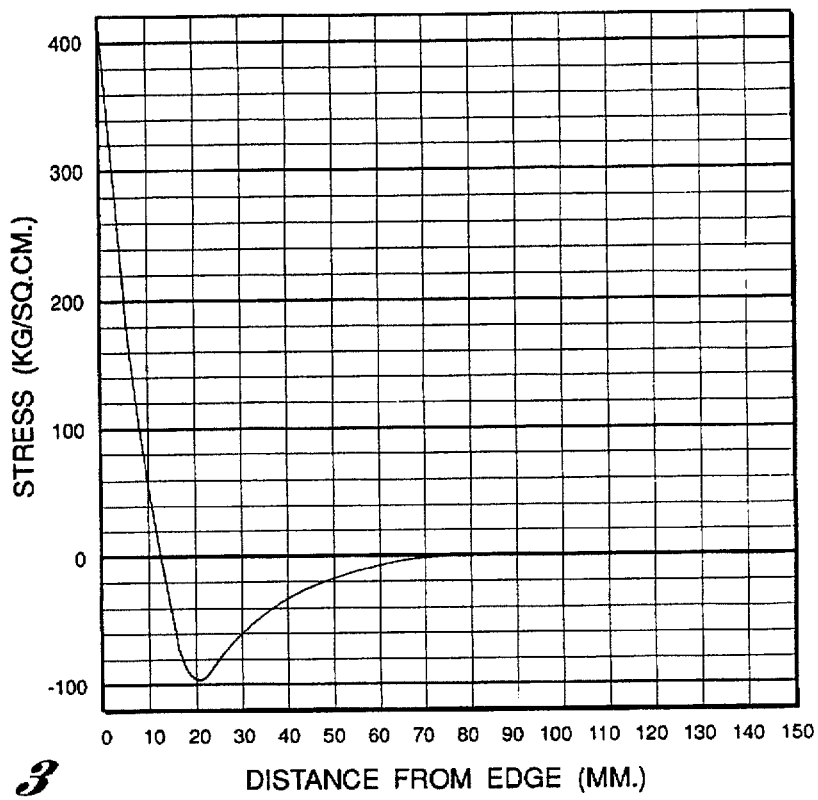
FIG. 3 is a graphical illustration of stress of a glass sheet edge wherein the horizontal axis represents the distance from the glass sheet edge surface and wherein the vertical axis indicates the net stress of all compression and tension at each location, with a positive value being net compression and a negative value being net tension.
Figure 5:
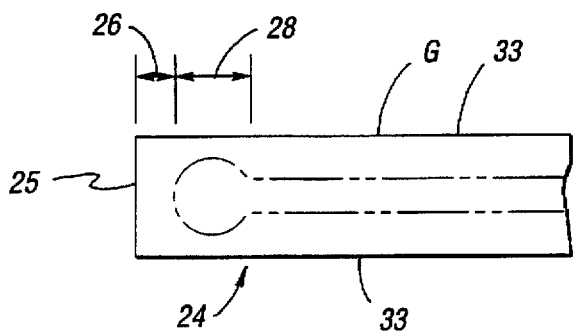
FIG. 5 is a view of a glass sheet edge that is cooled in accordance with the prior art to have surface compression outside of the phantom line indicated shape and tension inside of that shape.

With combined reference to FIGS. 3 and 5, it will be noted that the prior art type of press formed glass sheet has its edge 24 (FIG. 5) inboard from the outer edge portion 26 provided with an inner edge portion 28 whose surface compression is not only relatively shallow, i.e. close to its oppositely facing surfaces 33, but also has as shown in FIG. 3 a much greater extent of net inner band tension. More specifically, FIG. 5 illustrates by a phantom line shape the location of transition between compression and tension stresses where the compression stress is located outward of the phantom line shape and the tension stress is located within its interior.

Figure 4:
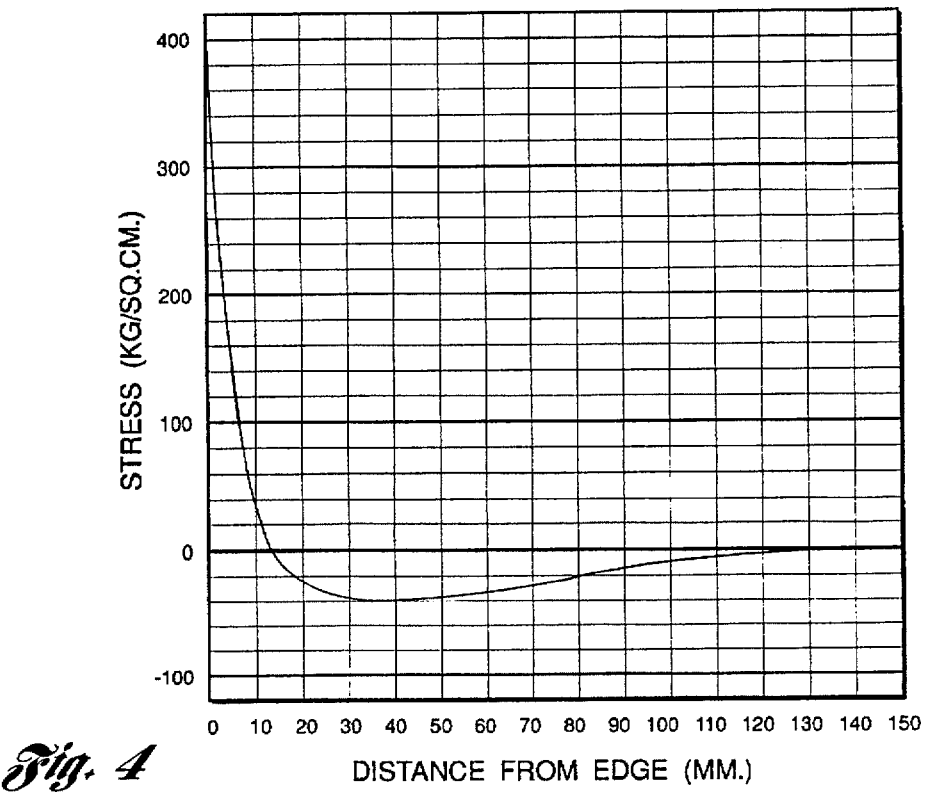
FIG. 4 is a graphical illustration similar to FIG. 3 but illustrating the change in the edge stress when the glass sheet is cooled in accordance with the present invention.
Figure 6:
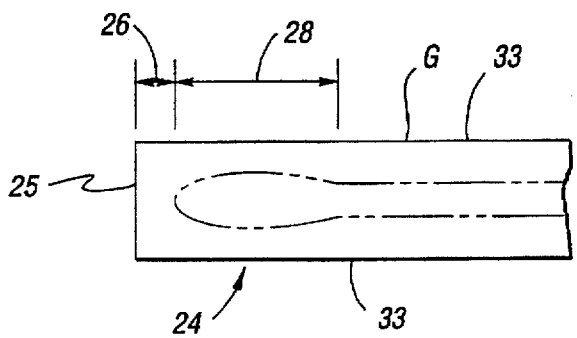
FIG. 6 is a view similar to FIG. 5 of a glass sheet edge wherein the cooling has been performed in accordance with the present invention to increase the depth of the surface compression at the edge of the glass sheet in addition to decreasing the maximum value of the net inner band tension.

As illustrated by FIGS. 4 and 6, slower cooling by use of the insulator 30 as described above results in an inner edge portion 28 whose surface compression is much deeper from the oppositely facing glass surfaces 33 and also has a lower maximum value of the net inner band tension.

With reference back to FIG. 2, the cooling ring assembly 20 also includes a cooler 34 for providing increased cooling to at least one localized area of the edge portion 24 of the formed glass sheet as compared to the rest of the inner edge portion to increase the surface compression and depth thereof at the localized area. This cooler 34 as illustrated provides the localized area of cooling at a coating with a greater emissivity than the uncoated glass, such as a metallic coating 36. As illustrated in FIG. 1, there may be a plurality of the localized areas of metallic coatings 36 such as is needed to provide bus bars of a vehicle window heater 38 of the electric resistance type and may also be utilized to provide a window wiper heater 40 that prevents freezing on the wiper during cold weather.

With continuing reference to FIG. 2, the cooler 34 is disclosed as including a pressurized air supply 42 that supplies a flow of pressurized air or any other suitable gas to each localized area of the formed glass sheet edge for the increased cooling without flow of the pressurized air to a central portion of the glass sheet. More specifically, the pressurized air supply 42 includes a source 44 of pressurized air or another suitable gas, a conduit 46 for conveying the pressurized air and a tube 48 having opening outlets 50 through which the pressurized air flows to the localized area of the formed glass sheet edge 24 for the cooling. As specifically illustrated, the tube 48 has a rectangular cross-section that is illustrated as being square. This rectangular cross-section of the tube 48 facilitates its mounting on the cooling ring while maintaining the proper direction of flow from the tube outlets 50 even when the tube has to be bent in order to conform to the shape of the glass sheet edge involved.

As mentioned above, the cooler 34 is illustrated in FIG. 1 as having a construction that cools a plurality of spaced localized areas of the glass sheet edge 24, although in the broadest practice of the invention cooling of only a single localized area can provide advantageous results such as providing such cooling at a single window wiper heater as previously described.

As illustrated in FIG. 2, the support ring assembly 20 includes a support ring 52 that has an L-shaped cross-section. An adjustable mount 54 of the cooling ring assembly 20 is illustrated as being of the threaded bolt and nut type and adjustably mounts the cooling ring 22 on the support ring at spaced locations about the ring so as to permit adjustment to the required position around the entire extent of the cooling ring. An insulator and cooler support 56 is also mounted in a suitable manner by the support ring 52 and supports the insulator 30 on which the tube 48 of cooler 34 is also shown as being mounted. Also, the cooling ring 22 has a metallic mesh 57 that engages the edge 24 of the formed glass sheet to reduce conductive heat transfer to the cooling ring. This metallic mesh is preferably embodied by a stainless steel strip of hooks of a conventional hook and loop type detachable fastener and is secured to the cooling ring 22 by spaced welds that are not shown.

The cooler 34 described above increases the cooling rate at each localized area on which there is a metallic coating 36 as illustrated in FIGS. 1 and 2. Provision of the cooler increases the rate of cooling so that there is a greater extent of compression and depth thereof at the inner edge portion 28 without having a net inner band tension that is excessively large so as to cause strength problems.

Figure 7:
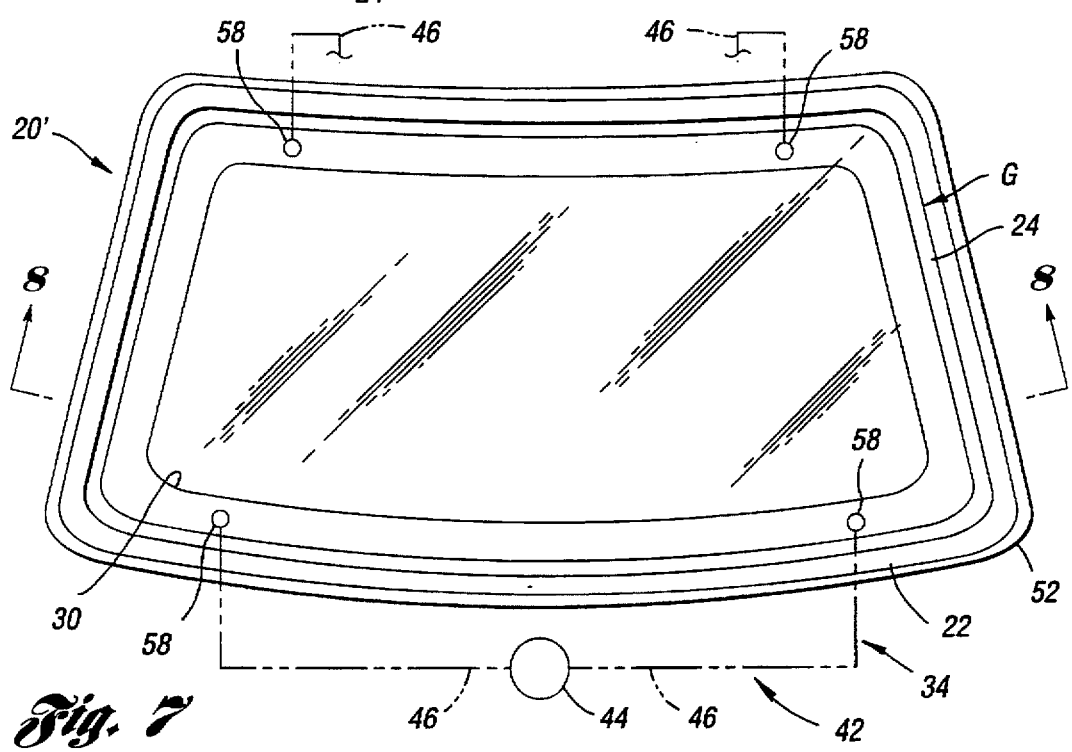
FIG. 7 is a view of another construction of the cooling ring assembly wherein increased cooling is provided at spaced localized areas of the glass sheet edge to increase the surface compression and depth thereof adjacent bends of the glass sheet in order to reduce breakage prior to installation.
Figure 8:
FIG. 8 is a side view of a glass sheet that is cooled on the cooling ring assembly of FIG. 7 and is taken along the direction of line 8—8 thereof to illustrate the bends where the localized areas of increased surface compression are provided.
Figure 9:
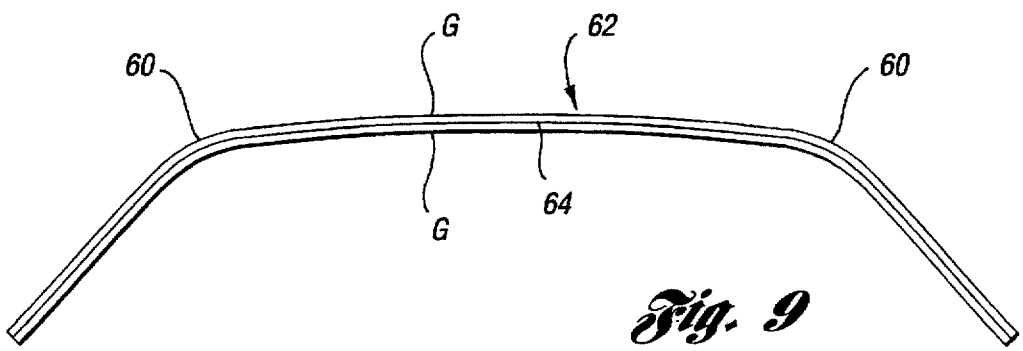
FIG. 9 is a view taken in the same direction as FIG. 8 but illustrating a pair of the formed glass sheets laminated to each other to provide a laminated window.
Figure 10:
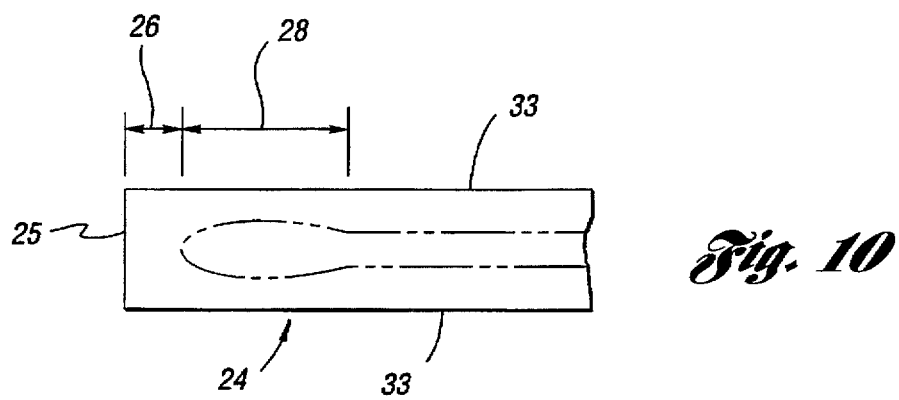
FIG. 10 is a view of the type illustrated in FIGS. 5 and 6 but illustrated the distribution of compression and tension stresses of a glass sheet edge that is cooled by the cooling ring assembly illustrated in FIG. 9 with the increased cooling but without any coating that affects cooling.

With reference to FIGS. 7 and 8, another embodiment of the cooling ring assembly 20' has the same construction as the previously described embodiment except as will be noted such that the prior description is applicable and need not be repeated. With this construction, the cooler 34 has at least one localized area 58 where the increased cooling is provided to increase the mechanical strength thereof by providing a greater compressive stress having a greater depth. More specifically, as illustrated, there are spaced localized areas 58 that are illustrated adjacent glass bends 60 in order to reduce breakage upon bending about an axis along these bends between the localized areas that are cooled. The glass sheet actually has two such bends 60 such that there are two sets of the spaced localized areas 58 where cooling takes place. A pair of the formed glass sheets G as illustrated in FIG. 9 can be assembled to provide a laminated window 62 with the use of polyvinyl butyral 64 to secure the formed glass sheets to each other. With this cooling, the compression is increased and its depth from the outer edge surface 25 is increased as illustrated in FIG. 10.

Figure 11:
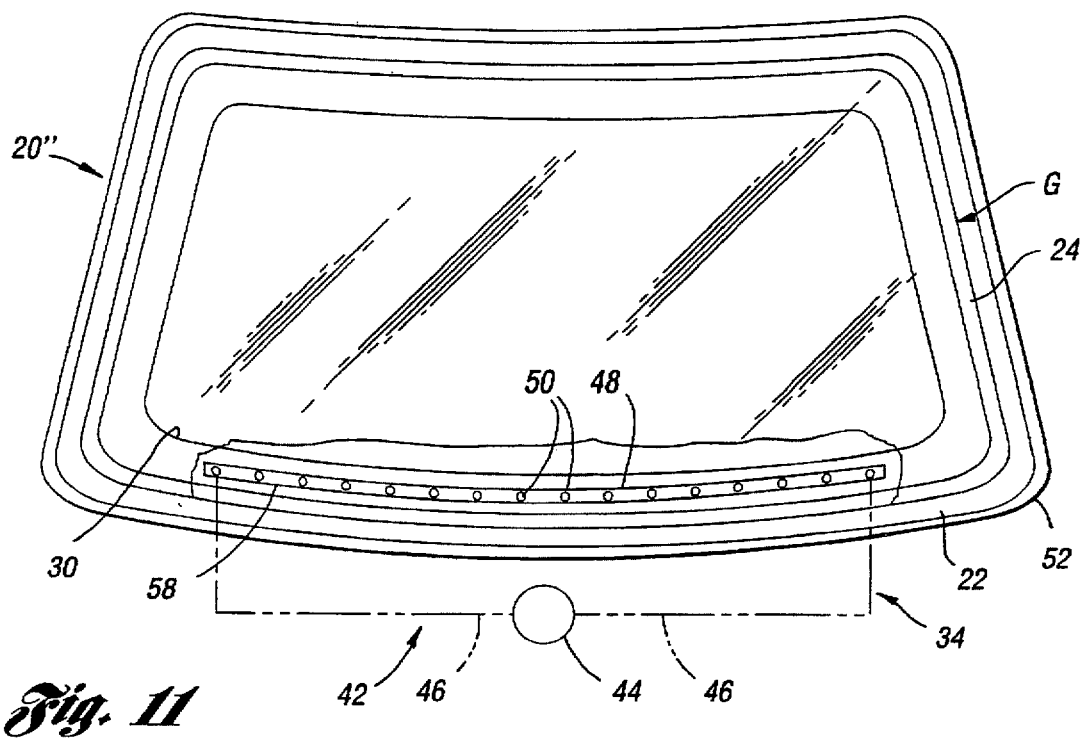
FIG. 11 is a view similar to FIG. 9 illustrating the manner in which the increased cooling can be provided adjacent the lower window edge where air turbulence causes small particles to abrade the glass surface.

With reference to FIG. 11, another embodiment of the cooling ring assembly 20 has the same construction as the embodiment of FIG. 7 and is utilized to cool a window without any metallic coating but is shown as providing the localized cooling at a single localized area 58 which is adjacent the lower edge of the window where turbulence takes place and entrains small particles that cause abrasion of the glass in a manner that can cause fractures.

The resultant formed glass sheets cooled on the cooling ring assembly 20, 20' or 20" have an edge 24 having a net inner band tension with a maximum value less than 60 kg/cm² and also have a localized area with increased surface compression provided by the increased cooling thereof as compared to the rest of the edge. Thus, the surface compression of each localized area is greater and deeper than would be present without such increased cooling of the localized area. With the glass sheet as illustrated in FIGS. 1 and 2, the localized area has a coating with a greater emissivity than the glass such as the metallic coating 36 as previously described where the increased cooling takes place to provide the increased and deeper surface compression. A plurality of the localized areas where the increased and deeper surface compression is provided is a spaced relationship from each other are disclosed by the glass sheets G in FIGS. 1 and 7 while a single such localized area is disclosed by FIG. 11. The increased surface compression reduces the bending about an axis between such areas such as along each bend 60 as illustrated in FIGS. 8 and 9. When the glass sheet edge 24 does not have any relatively high emissivity coating at which the increased cooling takes place, the increased compressive stress is deeper from the edge surface 25 as opposed to the oppositely facing surfaces 33. Thus, the outer edge portion 26 which is fully compression has a greater dimension in the FIG. 10 embodiment than in the FIG. 6 embodiment. The tension distribution of the FIG. 10 embodiment is thus shifted toward the right from the tension distribution of FIG. 6 embodiment. Both the embodiments of FIGS. 6 and 7 have the compressive stress deeper from the oppositely facing surfaces 33 than when cooling is performed without the insulator as in the prior art as illustrated by FIG. 5.

While the best modes for carrying out the invention have been described in detail, those familiar with the art to which this invention relates will recognize various alternative designs and embodiments for practicing the invention as defined by the following claims.

What is claimed is:

1. A cooling ring assembly on which a hot glass sheet that has been formed is cooled, the cooling ring assembly comprising:

a cooling ring that supports the edge of the formed glass sheet for the cooling;

an insulator juxtaposed inboard of the cooling ring to provide a reduced cooling rate at an inner edge portion of the glass sheet and to thereby provide a reduced maximum value of net inner band tension at the inner edge portion after the cooling is completed; and a cooler including a pressurized air supply that supplies a flow of pressurized air inboard of the cooling ring to a localized area of the edge of the formed glass sheet, without flow of said pressurized air to a central portion of the glass sheet, to provide increased cooling thereto and consequently increased surface compression and depth thereof at the localized area after the cooling is completed.

2. A cooling ring assembly as in claim 1 wherein the pressurized air supply includes a tube having outlets through which the pressurized air flows to the localized area of the edge of the formed glass sheet for the cooling.

3. A cooling ring assembly as in claim 2 wherein the tube of the pressurized air supply has a rectangular cross section.

4. A cooling ring assembly as in claim 1, 2 or 3 wherein the cooler has a construction that cools a plurality of spaced localized areas of the edge of the formed glass sheet.

5. A cooling ring assembly as in claim 1 which includes a support ring, an adjustable mount that adjustably mounts the cooling ring on the support ring, and an insulator support that mounts the insulator on the support ring.

6. A cooling ring assembly as in claim 1 wherein the cooling ring includes a metallic mesh that engages the edge of the formed glass sheet.

7. A cooling ring assembly on which a hot glass sheet that has been formed is cooled, the cooling ring assembly comprising:

a cooling ring that supports the edge of the formed glass sheet for the cooling;

an insulator juxtaposed inboard of the cooling ring to provide a reduced cooling rate at an inner edge portion of the glass sheet and thereby provide a reduced maximum value of the net inner band tension at the inner edge portion after the cooling is completed; and a cooler including a pressurized air supply for providing a pressurized air flow inboard of the cooling ring to provide increased cooling to a plurality of spaced localized areas of the edge of the formed glass sheet, without flow of said pressurized air to a central portion of the glass sheet, to provide increased surface compression and depth thereof at the localized areas after the cooling is completed.

8. A cooling ring assembly on which a hot glass sheet that has been formed is cooled, the cooling ring assembly comprising:

a support ring;

an adjustable mount on the support ring;

a cooling ring that is adjustably mounted by the adjustable mount on the support ring to support the edge of the formed glass sheet for the cooling;

an insulator support on the support ring;

an insulator mounted by the insulator support juxtaposed inboard of the cooling ring to provide a reduced cooling rate at an inner edge portion of the glass sheet and thereby provide a reduced maximum value of net inner band tension at the inner edge portion after the cooling is completed; and a cooler including a pressurized air supply for providing a pressurized air flow inboard of the cooling ring to provide increased cooling to a plurality of spaced localized areas of the edge of the formed glass sheet to provide increased surface compression and depth thereof at the localized areas.

* * * * *

UNITED STATES PATENT AND TRADEMARK OFFICE
CERTIFICATE OF CORRECTION

PATENT NO. : 5,679,124

DATED : October 21, 1997

INVENTOR(S) : James P. Schnabel, Jr., et al.

It is certified that error appears in the above-identified patent and that said Letters Patent is hereby corrected as shown below:

Item [75],

On the cover page, under the title "Inventors", change "Malby" to --Maltby--.

Signed and Sealed this

Fifth Day of October, 1999

Attest:

Q. TODD DICKINSON

*Attesting Officer*    *Acting Commissioner of Patents and Trademarks*